(12) United States Patent (10) Patent No.: US 9,387,806 B2
Bzoza (45) Date of Patent: Jul. 12, 2016

(54) TRUCK BED EXTENDER

(71) Applicant: Russell John Bzoza, San Diego, CA (US)

(72) Inventor: Russell John Bzoza, San Diego, CA (US)

( * ) Notice: Subject to any disclaimer, the term of this patent is extended or adjusted under 35 U.S.C. 154(b) by 55 days.

(21) Appl. No.: 14/272,502

(22) Filed: May 8, 2014

(65) Prior Publication Data

US 2014/0333083 A1 Nov. 13, 2014

Related U.S. Application Data

(60) Provisional application No. 61/821,241, filed on May 9, 2013.

(51) Int. Cl.
*B60P 3/34* (2006.01)
*B60R 5/04* (2006.01)

(52) U.S. Cl.
CPC ........... *B60R 5/041* (2013.01); *Y10T 29/49616* (2015.01)

(58) Field of Classification Search
CPC ........ B60P 3/40; B60P 1/435; Y02W 30/807; B01D 33/056; B62D 35/001; B62D 33/0273; B62D 35/007; B65D 21/022; B60R 13/01
USPC ....................................... 296/26.11
See application file for complete search history.

(56) References Cited

U.S. PATENT DOCUMENTS

| | | | | | |
|---|---|---|---|---|---|
| 4,472,639 | A | * | 9/1984 | Bianchi | B62D 33/0273 296/26.11 |
| 4,531,773 | A | * | 7/1985 | Smith | B62D 33/0273 224/403 |
| 5,253,913 | A | | 10/1993 | Metivier | |
| 5,468,037 | A | * | 11/1995 | Peterson | B62D 35/007 296/180.1 |
| 5,468,038 | A | * | 11/1995 | Sauri | B62D 33/08 296/26.1 |
| 5,658,033 | A | * | 8/1997 | Delaune | B60R 19/48 224/402 |
| 5,700,047 | A | | 12/1997 | Leitner | |
| 5,752,800 | A | * | 5/1998 | Brincks | B60P 3/40 296/26.11 |
| 5,755,480 | A | * | 5/1998 | Bryan | B62D 33/0273 224/403 |
| 5,765,892 | A | * | 6/1998 | Covington | B62D 33/0273 296/26.03 |
| 5,775,759 | A | * | 7/1998 | Cummins | B62D 33/0273 296/26.11 |
| 5,788,311 | A | * | 8/1998 | Tibbals | B62D 33/0273 296/26.11 |
| 5,806,907 | A | * | 9/1998 | Martinus | B62D 33/0273 296/26.11 |

(Continued)

*Primary Examiner* — Kiran B Patel
(74) *Attorney, Agent, or Firm* — Coastal Patent Law Group, P.C.

(57) ABSTRACT

The disclosure concerns a truck bed extender for use with a pickup truck. The truck bed extender is configurable in three states: (i) a first state provides for extending a size the enclosed truck bed, (ii) a second state provides a horizontal work surface, and (iii) a third state provides a collapsed storage about the tailgate portion of the pickup truck. Measuring gauges may be embedded or disposed on a surface of the truck bed extender. Additionally, a rectangular cover panel can be implemented for covering a gap disposed between a horizontal surface of the truck bed and the tailgate when extended outwardly.

5 Claims, 5 Drawing Sheets

(56) References Cited

U.S. PATENT DOCUMENTS

| | | | | |
|---|---|---|---|---|
| 5,853,116 A * | 12/1998 | Schreiner | B60R 9/00 | 220/4.29 |
| 5,857,724 A * | 1/1999 | Jarman | B62D 33/037 | 296/26.11 |
| 5,902,000 A * | 5/1999 | Wold | B62D 33/0273 | 296/26.11 |
| 5,941,588 A * | 8/1999 | Marconi | B62D 33/0273 | 296/26.11 |
| 5,992,719 A * | 11/1999 | Carter, III | B60R 9/00 | 220/8 |
| 5,997,066 A * | 12/1999 | Scott | B62D 33/0273 | 296/26.08 |
| 6,007,127 A * | 12/1999 | Garofalo | B62D 33/0273 | 296/26.11 |
| 6,019,410 A * | 2/2000 | Trostle | B60P 3/40 | 296/26.11 |
| 6,082,804 A * | 7/2000 | Schlachter | B60R 9/00 | 224/281 |
| 6,155,622 A * | 12/2000 | Reed | B62D 33/0273 | 296/26.08 |
| 6,193,294 B1 * | 2/2001 | Disner | B62D 33/0273 | 108/44 |
| 6,279,980 B1 * | 8/2001 | Straschewski | B62D 33/0273 | 296/26.11 |
| 6,340,190 B1 * | 1/2002 | Rosebrugh | B60P 3/40 | 296/26.11 |
| 6,513,850 B1 * | 2/2003 | Reed | B62D 33/0273 | 296/26.08 |
| 6,540,123 B1 * | 4/2003 | Kmita | B60R 5/041 | 224/403 |
| 6,550,841 B1 * | 4/2003 | Burdon | B60P 3/40 | 296/26.11 |
| 6,626,478 B1 * | 9/2003 | Minton | B60P 3/40 | 224/403 |
| D485,800 S * | 1/2004 | Smith | D12/414 | |
| 6,764,121 B1 | 7/2004 | Bauer | | |
| D504,384 S * | 4/2005 | Straschewski | D12/414 | |
| 6,908,134 B1 * | 6/2005 | Summers | B60P 3/40 | 296/26.11 |
| 6,994,389 B1 | 2/2006 | Graffy | | |
| 7,021,689 B1 * | 4/2006 | Weisbeck, III | B62D 33/0273 | 296/26.11 |
| 7,226,100 B1 * | 6/2007 | Willey | B62D 33/03 | 296/26.11 |
| 7,354,090 B1 * | 4/2008 | Pomorski | B60N 2/005 | 296/26.11 |
| 7,413,231 B1 * | 8/2008 | Wood | B62D 33/0273 | 296/26.08 |
| 7,628,439 B1 * | 12/2009 | Strong | B62D 33/0273 | 108/44 |
| 7,654,599 B2 * | 2/2010 | Stewart | B60P 3/40 | 296/26.11 |
| 7,828,356 B2 * | 11/2010 | Wood | B60P 3/40 | 296/26.08 |
| 8,182,012 B1 * | 5/2012 | Brister | B60P 3/40 | 296/26.11 |
| 8,317,251 B2 * | 11/2012 | Nelson | B60R 5/042 | 135/88.13 |
| 8,757,694 B1 * | 6/2014 | Kuhnle | B62D 33/03 | 296/26.08 |
| 8,764,088 B1 * | 7/2014 | Jobe | B65G 69/30 | 14/69.5 |
| 2002/0000732 A1 * | 1/2002 | Sanders | B60P 3/40 | 296/26.08 |
| 2002/0023938 A1 * | 2/2002 | Kmita | B60P 3/40 | 224/403 |
| 2002/0096901 A1 * | 7/2002 | Iafrate | B60P 3/40 | 296/26.11 |
| 2002/0101088 A1 * | 8/2002 | Rigau | B60R 11/06 | 296/37.6 |
| 2002/0153737 A1 * | 10/2002 | Fitts | B60P 3/40 | 296/26.11 |
| 2003/0127873 A1 * | 7/2003 | Reed | B62D 33/0273 | 296/26.08 |
| 2009/0195007 A1 * | 8/2009 | Miller | B60P 3/40 | 296/26.11 |
| 2009/0309381 A1 * | 12/2009 | Nelson | B62D 33/0273 | 296/26.11 |
| 2010/0026027 A1 * | 2/2010 | Gao | B62D 33/0273 | 296/26.11 |
| 2010/0078955 A1 * | 4/2010 | Smith | B62D 33/0273 | 296/26.11 |
| 2010/0283280 A1 * | 11/2010 | Kohlstrand | B60R 5/041 | 296/26.11 |
| 2012/0223541 A1 * | 9/2012 | Gianino | B62D 33/0273 | 296/57.1 |

* cited by examiner

TRUCK BED EXTENDER

CROSS-REFERENCE TO RELATED APPLICATIONS

This application claims the benefit of provisional patent application Ser. No. 61/821,241 filed May 9, 2013; the contents of which are hereby incorporated by reference.

BACKGROUND

1. Field of Invention

The present invention relates to the field of truck accessories by providing a convenient means for enclosing and extending the tailgate of a pick-up truck with a secondary function of converting into multi-purpose work platform.

2. Description of the Related Art

Truck bed extenders, in particular, truck bed extenders for pick-up trucks have been developed primarily to increase the usable length of the truck bed when the tailgate of said pick-up truck is lowered in an extended position. The popularity of conventional truck bed extenders exist in which components are comprised of adjustable round tubes with telescoping sections, as shown in U.S. Pat. No. 6,994,389 to Graffy, et al., and in U.S. Pat. No. 5,700,047 to Leitner, et al. With respect to many such devices, one of the problems that exist with previous truck bed extenders is the occurrence of items that are either improperly secured or that become subject to severe road conditions and have the potential risk of falling between such tubes, thus creating a safety hazard for other vehicles as well as loss of cargo. The same disadvantage applies to other conventional devices that consist of a cargo such as the truck bed partition to U.S. Pat. No. 5,253,913 A to Metivier and a cargo cage to U.S. Pat. No. 5,755,480 to Bryan. While such devices may have been developed to increase the capacity of transporting cargo while minimizing the risk of the aforementioned road hazards while in transport, the present truck bed extender, having a solid construction without any visible gaps when mounted, includes a secondary hinged rectangular cover panel that is mounted to the edge of the tailgate between said tailgate and the end of the truck bed, thus slightly overlapping the gap between the truck bed and the tailgate when said tailgate is extended, providing adequate cover for the tailgate gap.

As disclosed in U.S. Pat. No. 4,472,639 to Bianchi, a solid rectangular back panel with two corresponding panels are adjoined by respective hinges with the capability of being pivotally rotated to a closed folded position against the inside wall of the tailgate without limiting cargo space. Yet another aspect of the present truck bed extender is to provide a secondary optional function of a convenient sturdy rectangular multi-use work platform when the vehicle is not in transport, in particular, when in use at locations where a work platform is necessary, such as at a construction site. The implementation of gauges, preferably an angle gauge and a carpenter's square with ruler, are embedded into the back rectangular panel to provide added function to the user.

Although combining functions for convenience has been implemented in present truck bed extenders with respect to U.S. Patent No. U.S. Pat. No. 6,764,121 to Bauer whose bed extender additionally functions as a foldable ramp, and again to U.S. Pat. No. 5,700,047 to Leitner whose bed extender additionally functions as a storage compartment, the preferred embodiment has the advantage of providing a multi-purpose accessible work platform for standing work with means for measuring items, eliminating the need to transport an additional workbench and the measuring gauges of the same purpose.

SUMMARY

The present embodiment is an improved truck bed extender for a pick-up truck that addresses the need for providing solid enclosures of rigid material to an open tailgate for the purpose of transporting cargo with one embodiment having the capability of converting into a functional multi-purpose work platform for standing work when the tailgate is in a closed upright position resembling a box-like enclosure.

Wherein the present embodiment is not installed by the manufacturer to a new pick-up truck, the said embodiment is attached to the tailgate by initially securing attached hinge of the rectangular back panel to the uppermost edge of the said tailgate and pivoted into an open extended position enabling the adjoined side panels attached by respective hinges to fold outward. The said side panels, each having a hole, aligning over the pre-existing tailgate pin latch on the rear sidewalls of the truck bed wherein independent locking means, such as locking pins, secure said side panels to said sidewalls.

In accordance with another embodiment, a narrow rectangular secondary cover panel of sufficient size with hinged means is mounted to the lower edge of said tailgate, preferably by small conventional set screws, said secondary rectangular cover panel providing an enclosure between said tailgate and said truck bed, slightly overlapping said truck bed. Wherein said cover panel folds flush against the inner wall of tailgate when said tailgate is in a closed upright position or remain parallel to the truck bed.

In accordance to another aspect of the embodiment, said panels, when not in use, fold flush against the inside of the tailgate wall without utilizing cargo space with said rectangular back panel folded over cooperative panels to secure said panels from movement wherein said embodiment is secured from movement against the corrugated body of the truck.

In accordance to another aspect of the embodiment when the attached extended rectangular back panel is pivoted from an extended position into an upright position with said tailgate in a closed upright position, said embodiment has the ability to convert into an optional work platform, said rectangular panel having measuring gauges embedded into said rectangular panel for convenient means of measuring, preferably a protractor and an angle gauge.

Advantages

Accordingly several advantages exist of one or more aspects of the embodiment and are as follows: to provide a complete enclosure surrounding the extension of the tailgate on the pick-up truck that is comprised of rigid solid surfaces of hinged means, that can be secured easily, that can provide added length to the cargo bed of various pick-up trucks, that has the alternate capability to convert into a sturdy convenient multi-purpose work platform, that can be retracted into a folded position parallel to the inner surface wall of said tailgate without limiting cargo, that can provide additional enclosure by providing a separate rectangular cover panel to cover the slight gap between the extended tailgate and the truck. Other aspects of one or more advantages will be apparent from a consideration of the drawings and ensuing description.

DETAILED DESCRIPTION OF THE PREFERRED EMBODIMENTS

Figure 1:
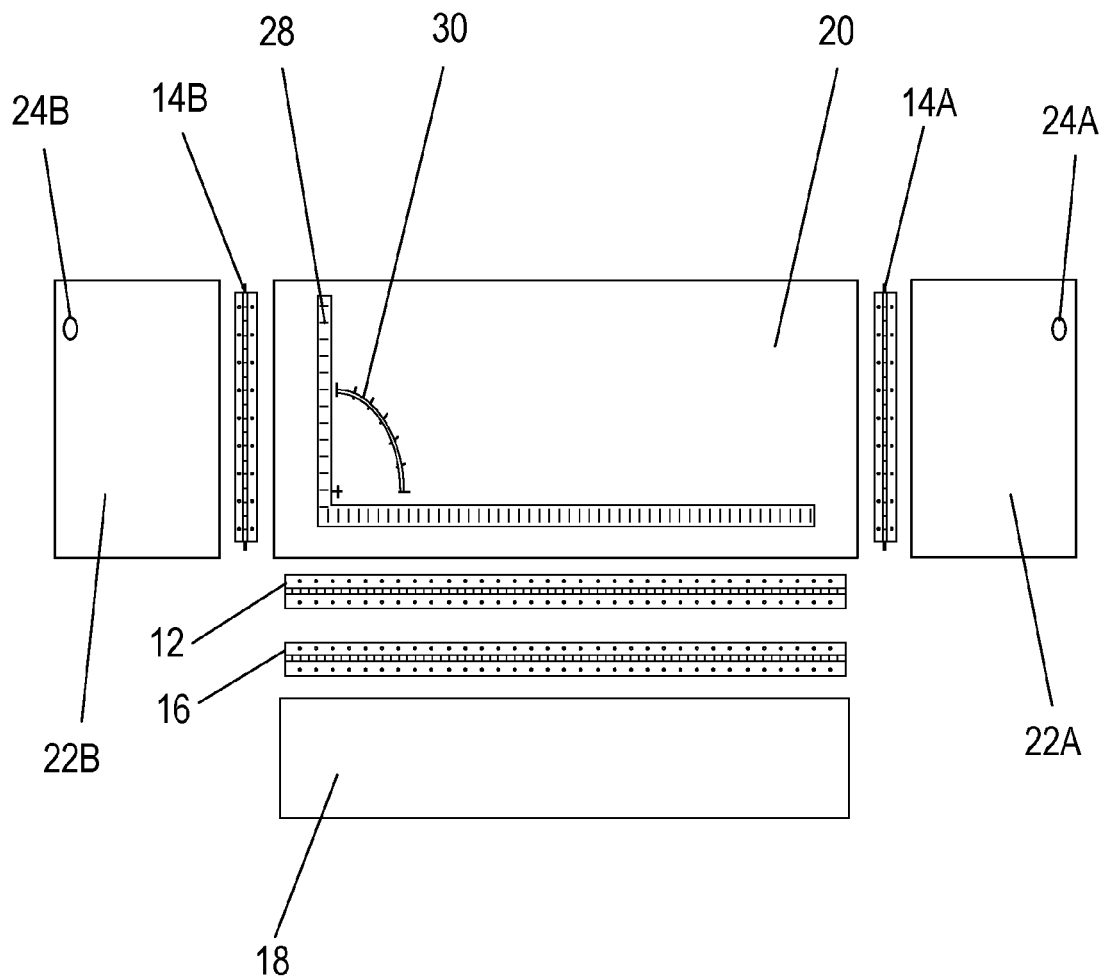
FIG. 1 is an exploded perspective of the embodiment, separated into components and prior to assembly.

Initially referring to FIG. 1 of the exploded embodiment wherein; 12, 14A, 14B and 16 illustrate the hinged components of operation, allowing pivotal rotation as follows: back rectangular panel 20 is adjoined to hinge 12, side panel 22A to hinge 14A, side panel 22B to hinge 14B with back rectangular panel 20 thus being joined to both hinge 14A and 14B respectively, with secondary rectangular cover panel 18 being adjoined to hinge 12. Thus, the separation of hinges in FIG. 1 defines components prior to manufacturing of the preferred embodiment. Locking holes 24A and 24B secure of said panels to the sidewalls of the truck bed by the use of independent means.

Figure 2:
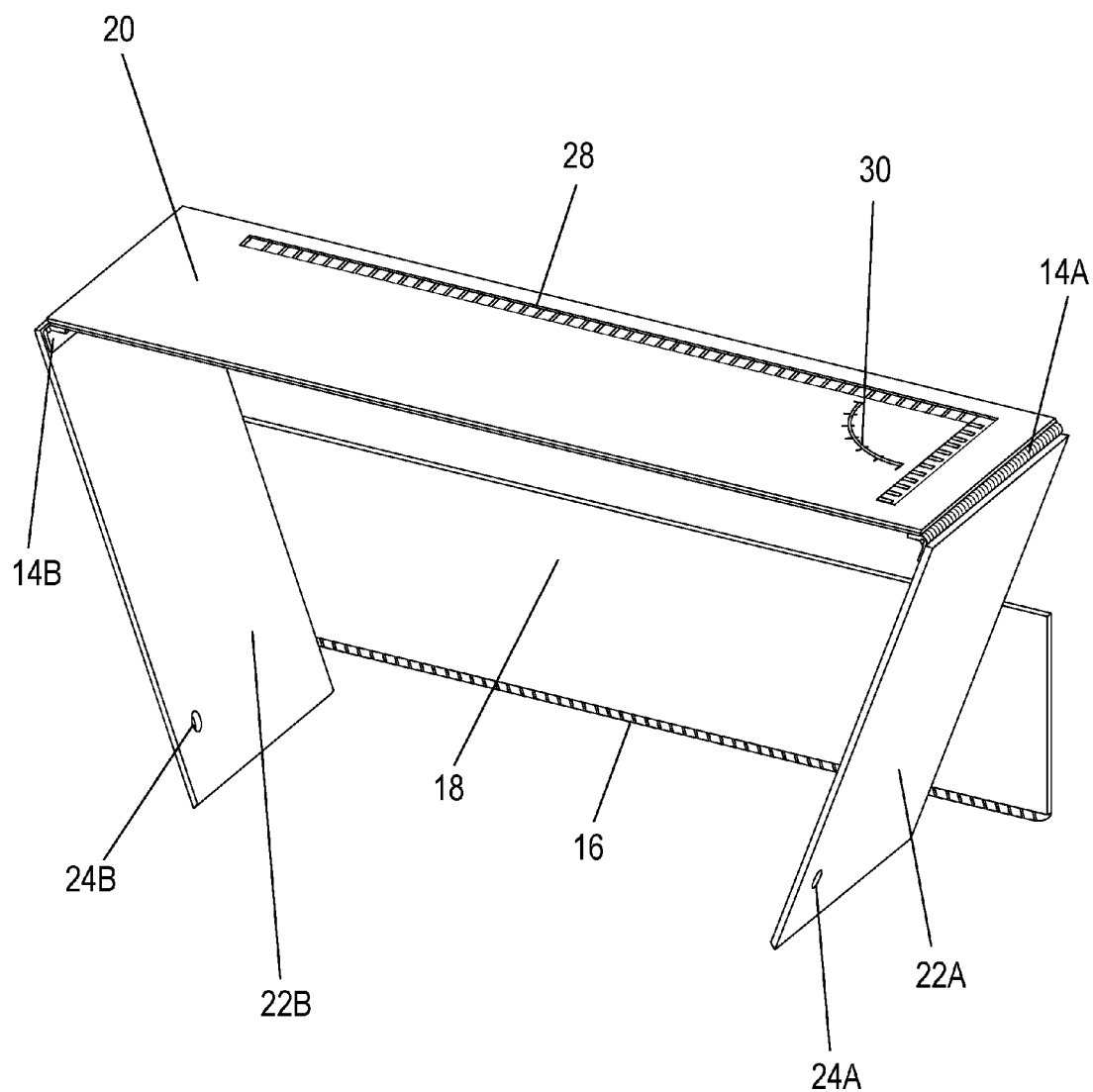
FIG. 2 is a perspective view of the assembled hinged components of the embodiment with the back rectangular panel in an upright position, the cooperative side panels being slightly folded inward and the secondary rectangular cover panel in an upright position.

FIG. 2 illustrates the active folding of side panel 22A and side panel 22B having cooperative attached hinges 14A and 14B that retract perpendicular inside said rectangular back panel 20. Secondary rectangular cover panel 18 is viewed in an upright position attached by hinge 16. Wherein, back rectangular panel 20 is illustrated in an upright position, as hinges 14A and 14B are in a successive stage of retracting 22A and 22B inward perpendicular to the inside of back rectangular panel 20.

Figure 3:
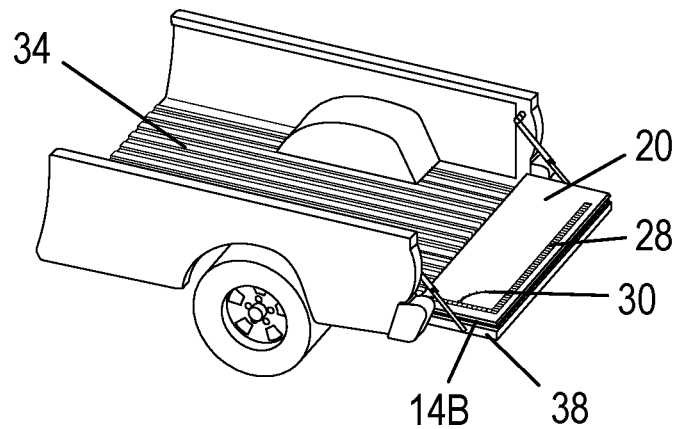
FIG. 3 is a perspective of the embodiment viewed in a closed position and attached to the tailgate, the said tailgate extended in a downward horizontal position.
Figure 4:
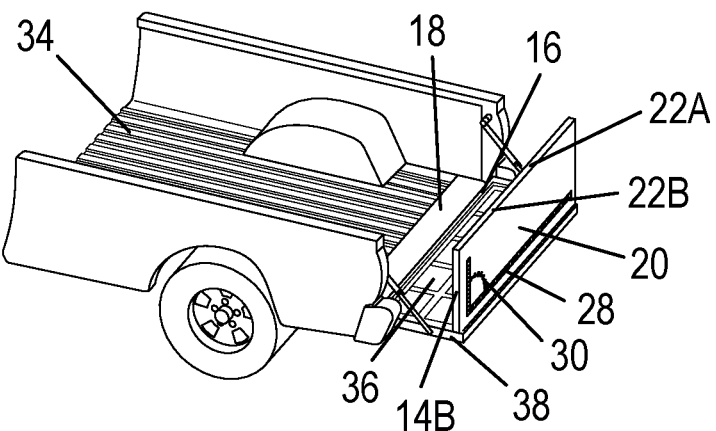
FIG. 4 is a perspective view of the embodiment in a successive stage of extension, with rectangular back panel in an upright position and side panels folded inward.
Figure 5:
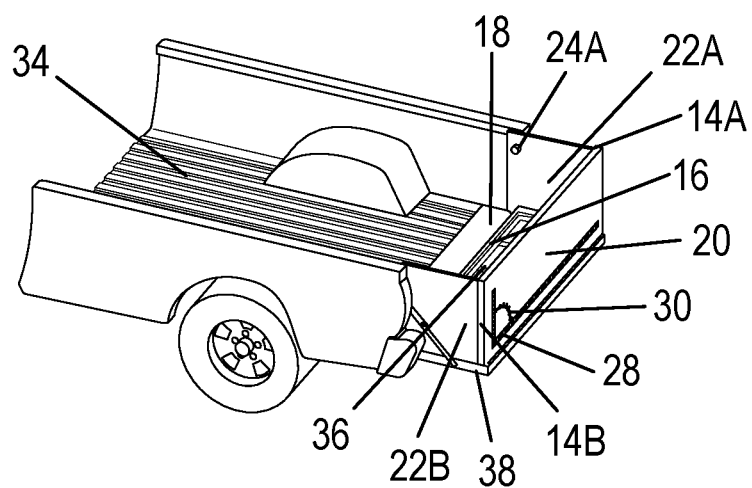
FIG. 5 is a perspective view of the embodiment having all components in an open extended position mounted to an extended tailgate.

FIGS. 3,4,5 illustrates the active extension of the embodiment as a truck bed extender when mounted and attached to a tailgate of a pick-up truck bed 34, the rectangular back panel 20, as viewed in a closed position on the extended tailgate, and FIG. 4 rectangular back panel 20 as being pivoted in a vertical position on the edge of the inner tailgate 36 while secondary rectangular cover panel 18 is seen as attached to the lower edge of tailgate 36, overlapping the edge of truck bed 34.

Figure 6:
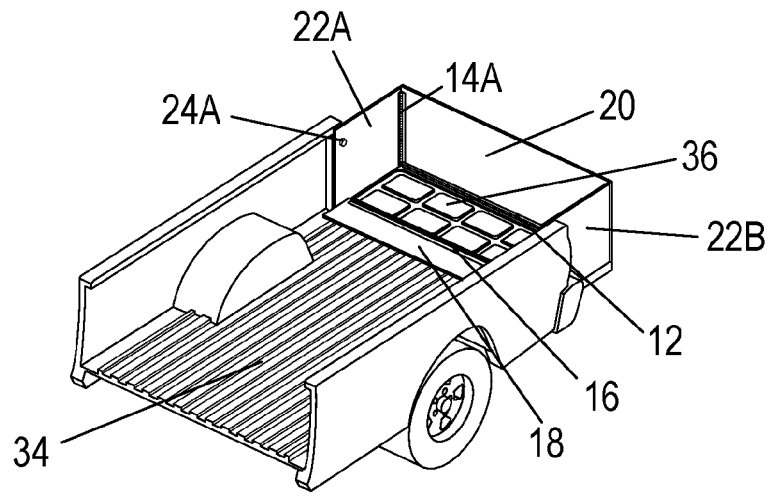
FIG. 6 is a perspective interior view of the bed of a pick-up truck as seen from the cab of said truck, with all components in an open extended position to an extended tailgate.

In FIG. 6 hinge 12 and side panel 22A are depicted from an inside view of the truck bed 34 with secondary rectangular cover panel 18 having hinged means 16 mounted to the inside panel of the extended tailgate 36 by independent means thus slightly overlapping said truck bed 34 in an open extended position, thus extending and enclosing the cargo space of said truck bed. Referring to locking hole 24A on said side panel 22A said panel will align on to pre-existing manufactured locking holes of the inner side wall of the said truck bed. FIG. 1 side panel 22B with locking hole 24B (not shown in FIG. 5) follow the coupling application as 22A and 24A.

Figure 7:
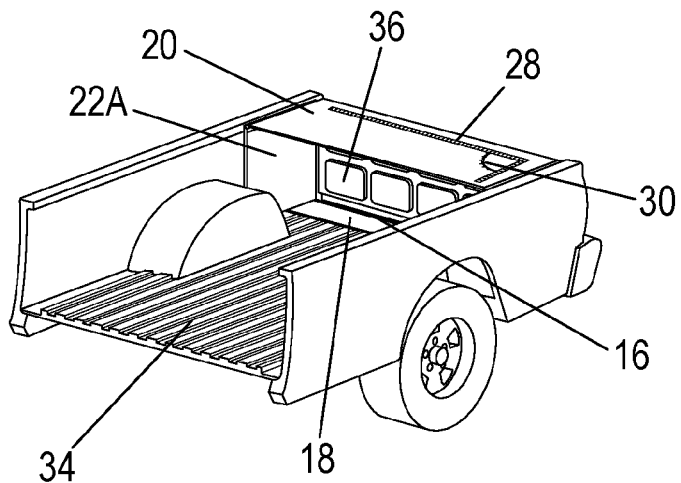
FIG. 7 is a perspective interior view of the embodiment as seen in an upright position with the back rectangular panel converted into the top panel of the multi-purpose platform.

Referring to FIG. 7, the tailgate is viewed from a closed upright position with back panel 20 now secured through pivotal rotation of hinged means and thus converted into a functional multi-use work platform with embedded carpenter's square 28, and angle gauge 30 within suitable reach for the user. Secondary rectangular cover panel 18 attached to hinge 16 remains secured in a stationary position as illustrated in FIG. 4-6.

Figure 8:
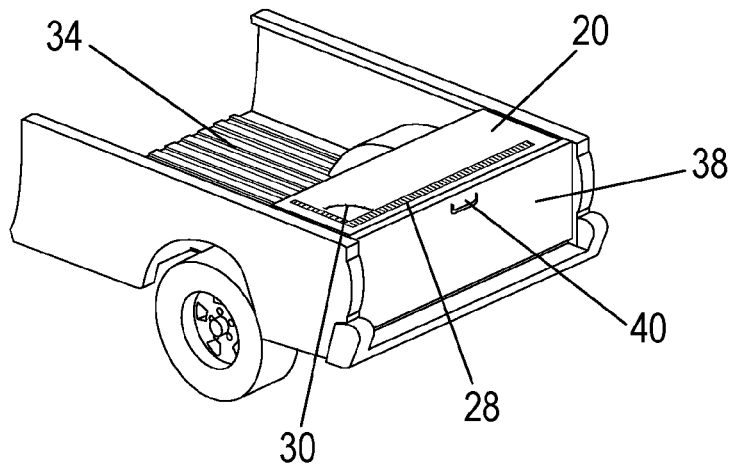
FIG. 8 is a perspective view with back rectangular panel seen in an upright position as illustrated in FIG. 7, as seen from the back end of a closed tailgate.

FIG. 8 illustrates the embodiment as viewed from the rear of a closed tailgate 36 rectangular back panel 20 converted into an upright multi-use work platform. From this perspective, the said converted back panel 20 provides a top box-like enclosure to said tailgate 36 and the rear of said truck bed 34. Latch 40 of said tailgate outer panel 38 enables the user to pivot the tailgate in either downward position, the said embodiment remaining secure by said locking means rotated into a former truck bed extension FIG. 5-6, or an upright position FIG. 7-8.

Figure 9:
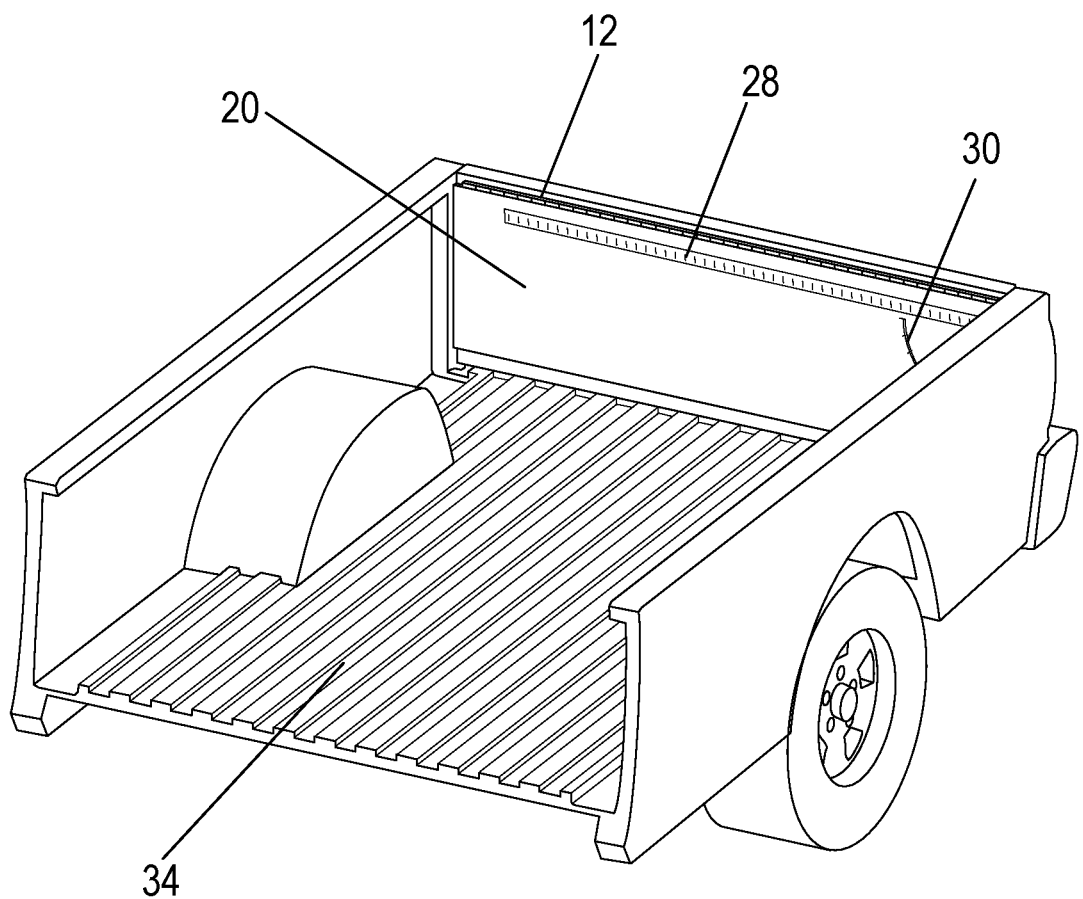
FIG. 9 is a perspective view of the embodiment with all panels closed flush to the wall of the tailgate in a closed upright position, the back rectangular panel overlapping all members of the embodiment and thus not in view.

Referring to FIG. 9, the embodiment, having secured hinged means, is illustrated in a downward folded position, flush to the inside of the closed upright tailgate, rectangular panel 20 thus overlapping side panel 22A, panel 22B and secondary rectangular cover panel 18 (not shown but depicted in FIG. 5-6). Said side panels 22A and 22B having conventional locking means withdrawn from locking holes FIG. 1-2 enable said side panels 22A, 22B to disengage from said truck bed inner side walls and rotate inward.

Operation—FIG. 3, FIG. 4, FIG. 5, FIG. 7, FIG. 8, FIG. 9

The process of attachment of the embodiment to the tailgate of the pick-up truck presents many similarities to many truck bed extenders in present use. Namely, one first attaches said embodiment to the inner wall of the extended tailgate by independent means, thus securing the truck bed extenders in an op means, thus securing the truck bed extenders in an op en position and therefore allowing the transport of additional cargo otherwise limited by said tailgate in a closed upright position.

In operation of the present embodiment, rectangular back panel 20 (FIG. 3) is shown enclosing side panels 22A, 22B, on the vertically extended tailgate 36, with hinge 12 mounted to the lower edge of said tailgate, whereby hinge 12 (FIG. 4) is viewed as mounted to the uppermost edge of the extended tailgate 36, with said rectangular back panel in the active stage of extension. In addition, the measuring devices 28, 30, located on said rectangular back panel are seen from an exterior view of said extended tailgate, and secondary rectangular cover panel 16 is seen as mounted on the lower edge of the tailgate, the said secondary rectangular cover panel is shown slightly overlapping the truck bed (FIG. 4).

FIG. 5 shows the progressive state of a complete extension of the embodiment whereby side panels 22A and 22B have been rotated perpendicularly on hinges 14A and 14B, respectively to form an enclosed extension of the tailgate, thus resembling the said enclosure of said tailgate in an upright closed position. In addition, locking holes 24A and 24B have been aligned to respective existing pin latches of said sidewalls, allowing the use of independent means to be inserted through said locking holes, thus securing the attached embodiment further, said side panel having a slight overlap on said sidewalls.

Referring to FIG. 7, and FIG. 8 wherein the tailgate 38 has been rotated to a vertical closed position, the embodiment is viewed in an upright position with the rectangular back panel 20 in an upright position parallel to the rear bed of the truck 34. The carpenter's square 28 now positioned upright with the angle gauge 30 slightly above said carpenter's square and ready for use in a standing position. Side panels 22A and 22B having been rotated to an upright position against the sidewalls remain secured in order to support said rectangular back panel.

To retract the embodiment while attached to the tailgate as viewed in FIG. 9, locking mechanisms that secure side panels 22B (as viewed in FIG. 5) are removed from the side holes 24A, 24B (FIG. 2, FIG. 5) whereby said side panels fold under the rectangular back panel 20, said back panel folds over all members in a compact manner, with the molding on the edge of the truck bed 40 lodging said embodiment in place.

Advantages

Accordingly several advantages exist in the function of the embodiment and are as follows:

(a) The said embodiment provides a stable solid enclosure that extends the cargo length of a bed of a pick-up truck to minimize loss of cargo.

(b) The said embodiment consists of one rectangular back panel and two cooperative side panels that resemble the tailgate when viewed in an extended position.

(c) The said embodiment consists of a secondary rectangular cover panel to add closure between the edge of the truck bed and tailgate to minimize loss of cargo.

(d) The said embodiment has the advantage of minimizing the risk the loss of small items and materials from falling out of the truck bed and potential road or site hazard.

(e) The said embodiment consists of the following: one rectangular back panel, two cooperative side panels, and one secondary rectangular cover panel having hinged means for pivotal rotation, having the ability to extend downwardly as well as retract inwardly.

(f) The rectangular back panel of said embodiment, having hinged means on the lower edge of said panel can be mounted on the upper edge of the tailgate and secured in place by the use of independent means that are easily mounted through the holes of said hinges and attached to the lower edge of said tailgate.

(g) The said embodiment side panels contain a locking hole on the uppermost section of each of said panels to allow each said cooperative side panel attachment to the inner sidewalls of the truck, the said locking holes having the ability to align in front of each perspective latch opening of said sidewalls and to be secured into position by a locking mechanism.

(h) The said locking mechanism has the ability to be manually withdrawn from said locking holes by the user, enabling the said cooperative side panels to be retracted and thus folded inward for storage flush against the inner wall of said tailgate.

(i) The secondary rectangular cover panel, having hinged means, is mounted and secured separately from the truck bed extender by the use of independent means that are mounted through the holes of said hinge and attached to the lower edge of said tailgate. Said secondary rectangular cover panel having a slight overlap of the lower edge of the truck bed, thus providing enclosure between said truck bed and said tailgate.

(j) The said embodiment, having hinged means and attached to said tailgate in an outward extended position, has the capability of being pivotally rotated into an upright position, wherein said rectangular panel being converted into an optional multi-use work platform with said cooperative side panels, secured to the sidewalls of the truck bed by said locking mechanism.

(k) The rectangular back panel of said embodiment having been rotated into an upright position with the tailgate can safely function as a convenient multi-use work platform for standing work, the said embodiment may be made of various materials to withstand all DOT (Department of Transportation) specifications.

(l) The said rectangular back panel of the embodiment contains measuring gauges embedded therein, preferably in the lower left corner of said rectangular back panel as a convenient means of measuring items.

(m) Measuring gauges can be accessed on the rectangular panel in various stages in extension and retraction, and in an upright position as a multi-purpose work platform.

CONCLUSION, RAMIFICATIONS, AND SCOPE

Accordingly, the complete enclosure provided by the preferred embodiment will provide a safer means of transporting items in the bed of a pick-up truck than present truck bed extenders with pipe or tube enclosures. In addition, the presence of a secondary rectangular panel will provide a separate cover over the small gap between the end of the truck bed and the tailgate. Furthermore, the optional conversion from a truck bed extender to a multi-use work platform without further required installation provides additional convenience to the user. Further advantages are as follows:

allows installation by the manufacturer of a new pick-up truck, in which such installation functions as a permanent component of such vehicle or with the option of being attached separately to existing pick-up trucks;

it can be manufactured in different lengths and sizes to accommodate the different lengths and sizes of various pick-up trucks;

it can be manufactured using various materials;

includes but is not limited to specific functions of multi-use work platform;

hinge mechanisms are not limited to the use of various style hinges;

it provides measuring gauges including but not limited to an angle gauge and a carpenter's square embedded into the back rectangular panel; and attachment of panels are not limited to the use of conventional hinges and may vary based on material used.

While the above description contains many specifications, these should not be construed as limiting the scope of any embodiment, but as exemplifications of various embodiments thereof. Many other ramifications and variations are possible within the teachings of various embodiments. For example, the size and length of the panels of the embodiment can vary to accommodate different lengths and sizes of various pick-up trucks, the measuring gages can vary upon manufacturing and design, the installation of the embodiment can be manufactured into a new vehicle or installed by the user of an existing vehicle, and the embodiment can be manufactured using various materials.

Thus, the scope should be determined by the appended claims and their legal equivalents and not by the examples given.

REFERENCE SIGNS LIST rectangular back panel bottom hinge (12)
side panel hinge (14 A)
side panel hinge (14 B)
secondary rectangular cover panel hinge (16)
secondary narrow rectangular cover panel (18)
rectangular back panel (20)
side panel (22A)
side panel (22B)
carpenter's square (28)
angle gauge (30)
tailgate (32)
truck bed (34)
tailgate inner wall (36)
tailgate outer panel (38)
tailgate latch (40)

I claim:

1. A truck bed extender for attachment with the bed portion of a pickup truck, the truck bed extender comprising:
   a rectangular back panel, the rectangular back panel configured for hinged attachment with a tailgate of the pickup truck, wherein a first hinge is configured to attach the rectangular back panel to a first edge of the tailgate of the pickup truck, said rectangular back panel further comprising one of: an embedded carpenters square, an angle gauge, or a combination thereof;
   a first side panel attached to a first side of the rectangular back panel via a second hinge extending therebetween; and
   a second side panel attached to a second side of the rectangular back panel via a third hinge extending therebetween, the second side of the rectangular back panel being opposite the first side; and
   a secondary rectangular cover panel configured to attach to a second edge of the tailgate via a fourth hinge extending therebetween, the second edge of the tailgate being opposite the first edge.

2. The truck bed extender of claim 1, wherein said first side panel further comprises a first locking hole disposed at a corner thereof, wherein said first locking hole is configured to engage and lock with a first pin disposed on the truck bed.

3. The truck bed extender of claim 2, wherein said second side panel further comprises a second locking hole disposed at a corner thereof, wherein said second locking hole is configured to engage and lock with a second pin disposed on the truck bed.

4. The truck bed extender of claim 1, wherein in a first configuration with the truck tailgate oriented horizontally, the truck bed extender is configurable such that: (i) the rectangular back panel extends vertically, (ii) each of the first and second side panels extends vertically between the rectangular back panel and the truck bed, and (iii) the secondary rectangular cover panel extends over a gap between the truck bed and the tailgate attached therewith.

5. The truck bed extender of claim 1, wherein in a second configuration with the truck tailgate oriented vertically, the truck bed extender is configurable such that: (i) the rectangular back panel extends horizontally, (ii) each of the first and second side panels extends vertically between the rectangular back panel and the truck bed, and (iii) the secondary rectangular cover panel extends over a gap between the truck bed and the tailgate attached therewith.

* * * * *